US010284756B2

(12) United States Patent
Perez et al.

(10) Patent No.: US 10,284,756 B2
(45) Date of Patent: May 7, 2019

(54) CAMERA ASSEMBLY AND SYSTEM FOR MOUNTING THEREOF

(71) Applicant: Bio-Rad Laboratories, Inc., Hercules, CA (US)

(72) Inventors: Evelio Perez, Hercules, CA (US); Evan P. Thrush, San Anselmo, CA (US); Stephen L. R. Swihart, Walnut Creek, CA (US); Brian D. Hall, San Lorenzo, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 113 days.

(21) Appl. No.: 15/449,786

(22) Filed: Mar. 3, 2017

(65) Prior Publication Data

US 2017/0264828 A1     Sep. 14, 2017

Related U.S. Application Data

(60) Provisional application No. 62/307,214, filed on Mar. 11, 2016.

(51) Int. Cl.
| | |
|---|---|
| H04N 5/232 | (2006.01) |
| H04N 5/225 | (2006.01) |
| G03B 17/02 | (2006.01) |
| G03B 17/55 | (2006.01) |
| G03B 17/56 | (2006.01) |
| G03B 43/00 | (2006.01) |

(52) U.S. Cl.
CPC ........... *H04N 5/2254* (2013.01); *G03B 17/02* (2013.01); *G03B 17/55* (2013.01); *G03B 17/561* (2013.01); *G03B 43/00* (2013.01); *H04N 5/2252* (2013.01); *H04N 5/2253* (2013.01)

(58) Field of Classification Search
CPC ............. H04N 5/23296; H04N 5/2257; H04N 5/2253; H04N 5/2254; G02B 7/022
See application file for complete search history.

(56) References Cited

U.S. PATENT DOCUMENTS

| | | | |
|---|---|---|---|
| 4,330,176 A | 5/1982 | Kawai | |
| 4,384,767 A | 5/1983 | Kawai | |
| 4,533,212 A | 8/1985 | Shimizu | |
| 4,823,199 A | 4/1989 | Sakakibara et al. | |
| 5,800,344 A | 9/1998 | Wood et al. | |
| 6,324,021 B1 | 11/2001 | Shields | |
| 6,362,921 B1 * | 3/2002 | Iida | G02B 7/02 348/E5.025 |
| 6,592,225 B2 | 7/2003 | Wagner et al. | |
| 7,324,154 B2 | 1/2008 | Cheng | |
| 7,436,599 B2 * | 10/2008 | Mihara | G02B 13/0045 359/676 |

(Continued)

OTHER PUBLICATIONS

Bio-Rad, "Electrophoresis and Blotting" Protein Blotting Guide, Bulletin 2895, Sep. 13, 2011.

(Continued)

*Primary Examiner* — Padma Haliyur
(74) *Attorney, Agent, or Firm* — Weaver Austin Villeneuve & Sampson LLP

(57) ABSTRACT

Techniques and systems for implementing fast, fixed-focal-length lens imaging systems for molecular biology or genetics applications are provided. In particular, techniques and structures are provided for allowing for precise alignment of the optical and imaging components of such imaging systems during assembly with a minimal amount of adjustment.

17 Claims, 12 Drawing Sheets

(56) References Cited

U.S. PATENT DOCUMENTS

| | | | |
|---|---|---|---|
| 7,830,628 B2 | 11/2010 | Schaefer | |
| 8,400,688 B2 | 3/2013 | Allen et al. | |
| 8,548,313 B2 | 10/2013 | Krueger | |
| 8,938,160 B2* | 1/2015 | Wang | F16M 11/10 396/13 |
| 2001/0028510 A1 | 10/2001 | Ramm et al. | |
| 2002/0153422 A1 | 10/2002 | Tsikos et al. | |
| 2004/0263790 A1 | 12/2004 | VanOverloop et al. | |
| 2008/0259423 A1 | 10/2008 | Frekers et al. | |
| 2009/0196593 A1 | 8/2009 | Cheng | |
| 2010/0027110 A1 | 2/2010 | Ikeda et al. | |
| 2010/0066838 A1 | 3/2010 | Steckhan et al. | |
| 2010/0303385 A1 | 12/2010 | Putman et al. | |
| 2015/0053845 A1 | 2/2015 | Tsai | |
| 2015/0116787 A1 | 4/2015 | Kim | |
| 2015/0234198 A1 | 8/2015 | Hayakawa et al. | |
| 2015/0281532 A1 | 10/2015 | Yu et al. | |
| 2016/0214199 A1* | 7/2016 | Benzing | B23K 26/08 |

OTHER PUBLICATIONS

Bio-Rad, "Imaging" ChemiDoc™ XRS+ Imager, Bulletin 5837, Dec. 30, 2009.
General Electric, "Getting Started with ImageQuant™ LAS 4000, Original Instructions" GE Healthcare, Nov. 2009.
PCT International Search Report and Written Opinion, dated May 22, 2017, issued in PCT/US17/21595.
PCT International Preliminary Report on Patentability, dated Sep. 20, 2018, issued in PCT/US17/21595.

* cited by examiner

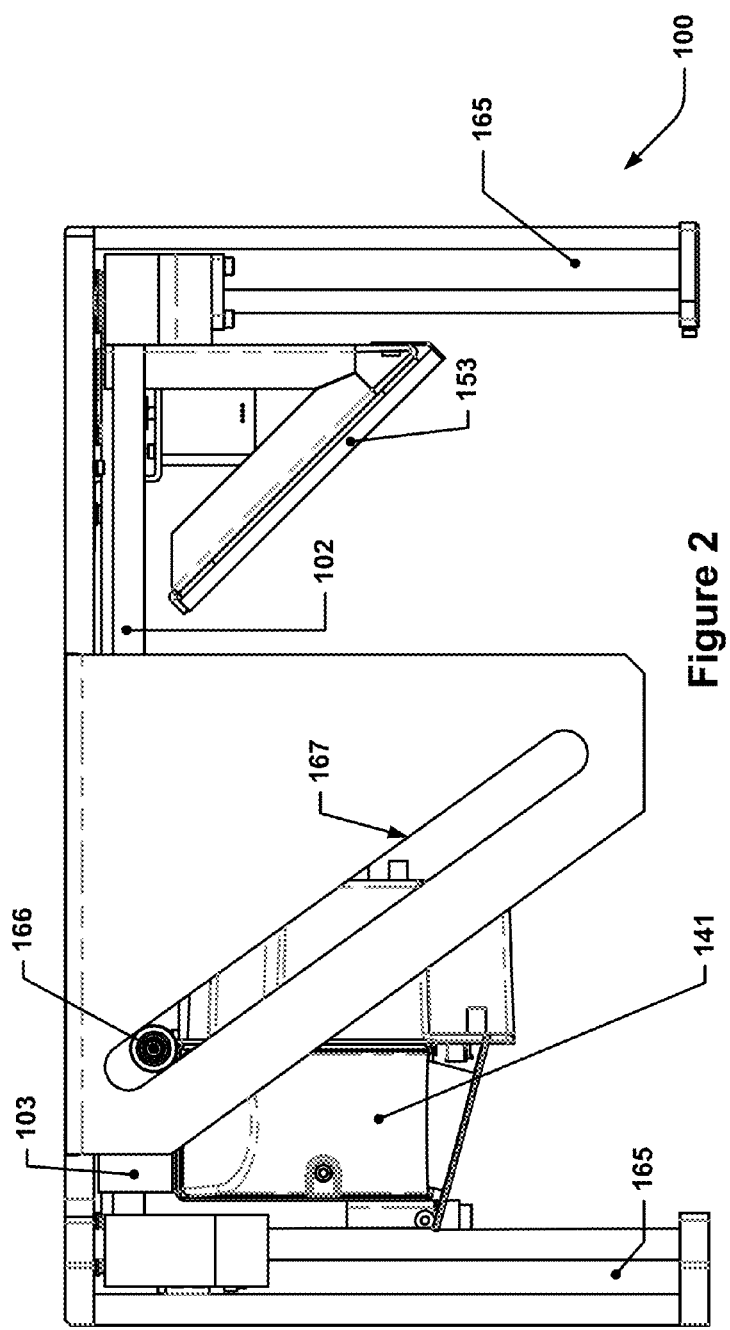
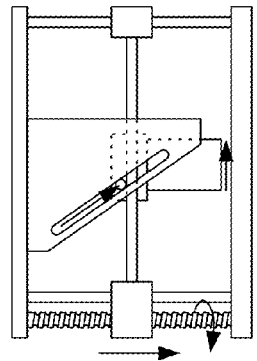
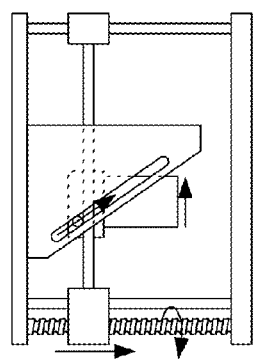
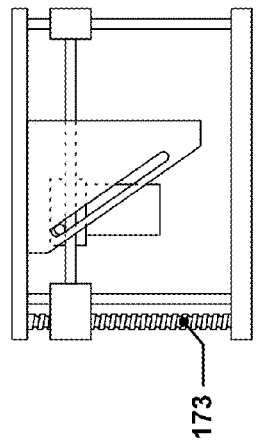

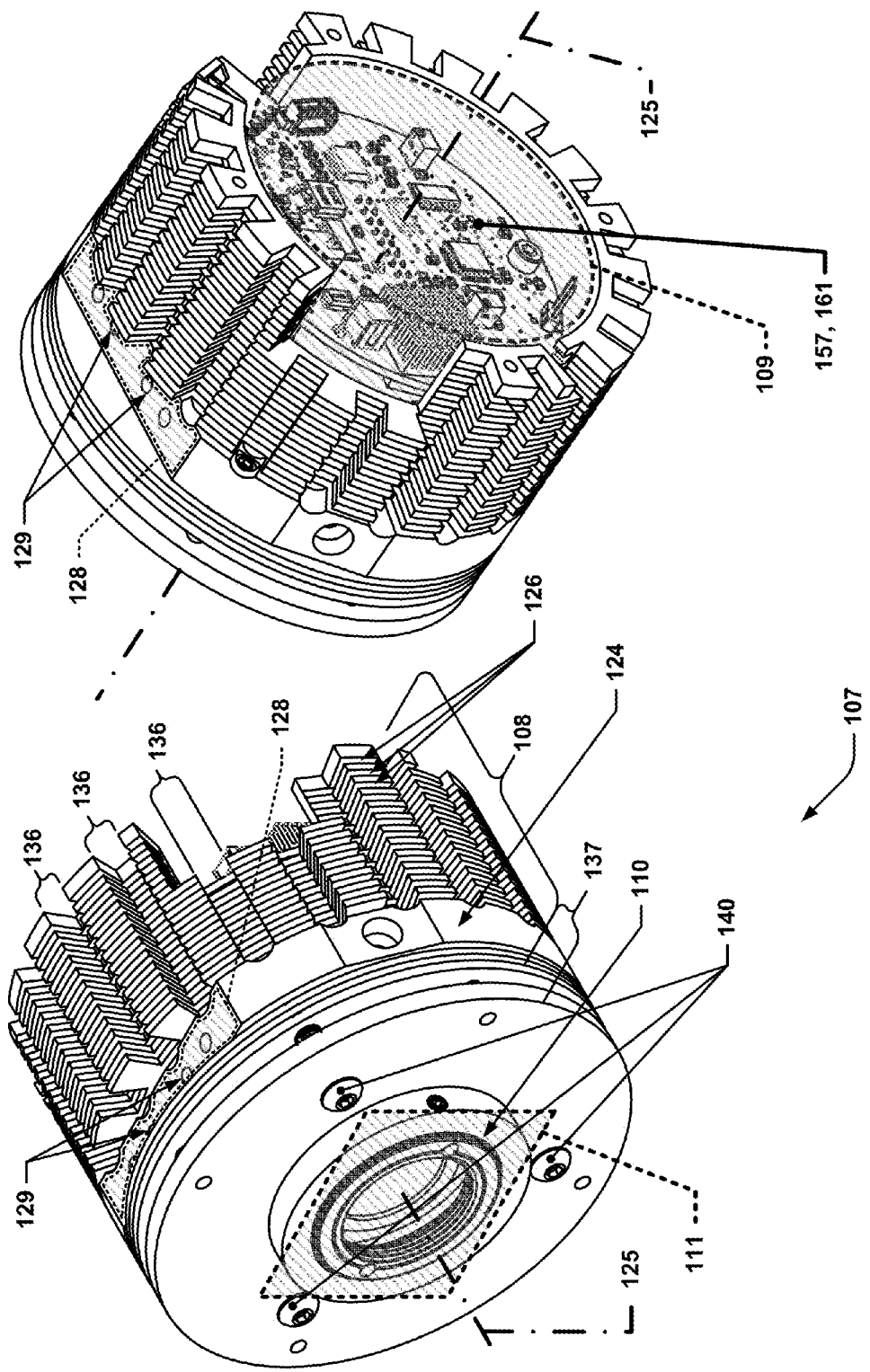

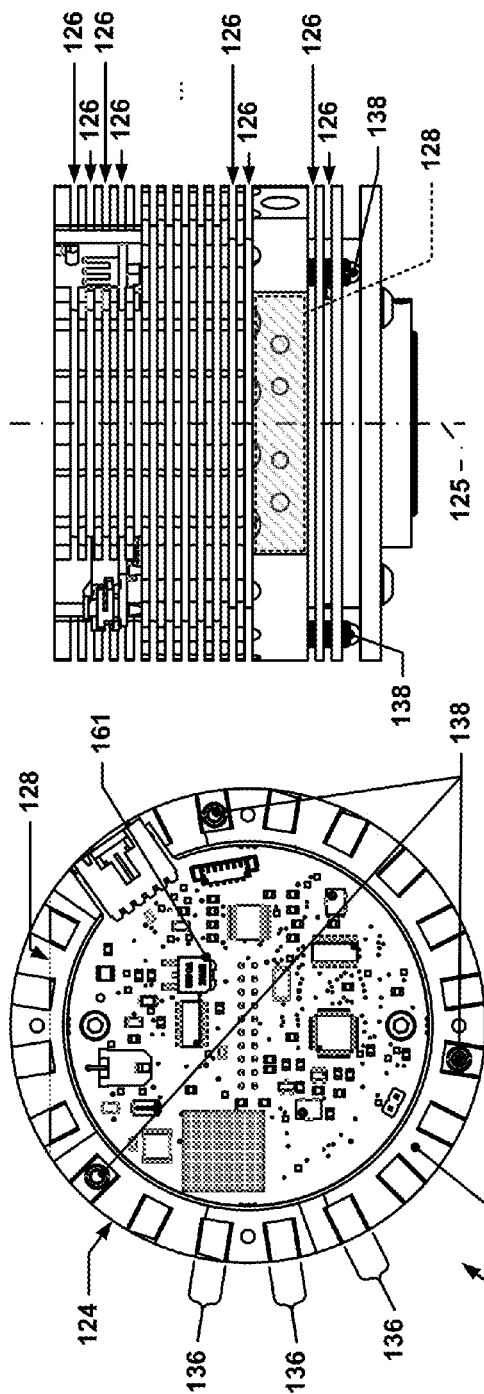
Figure 10
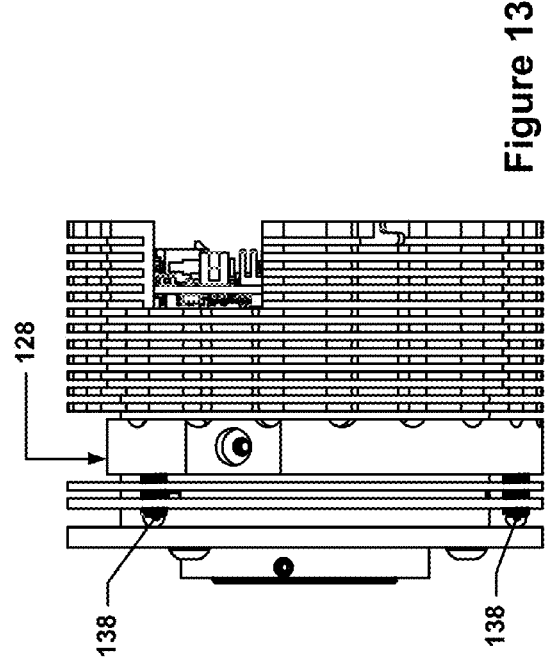
Figure 12
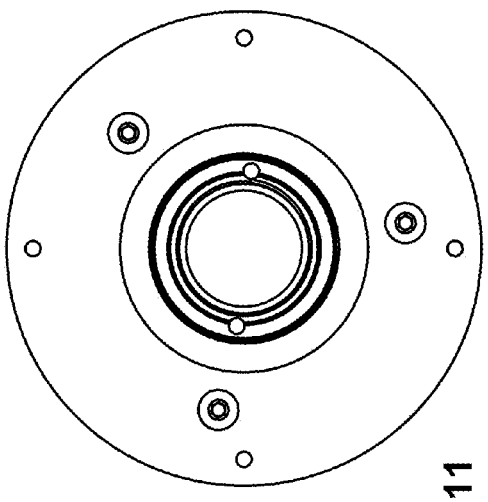
Figure 11
Figure 13

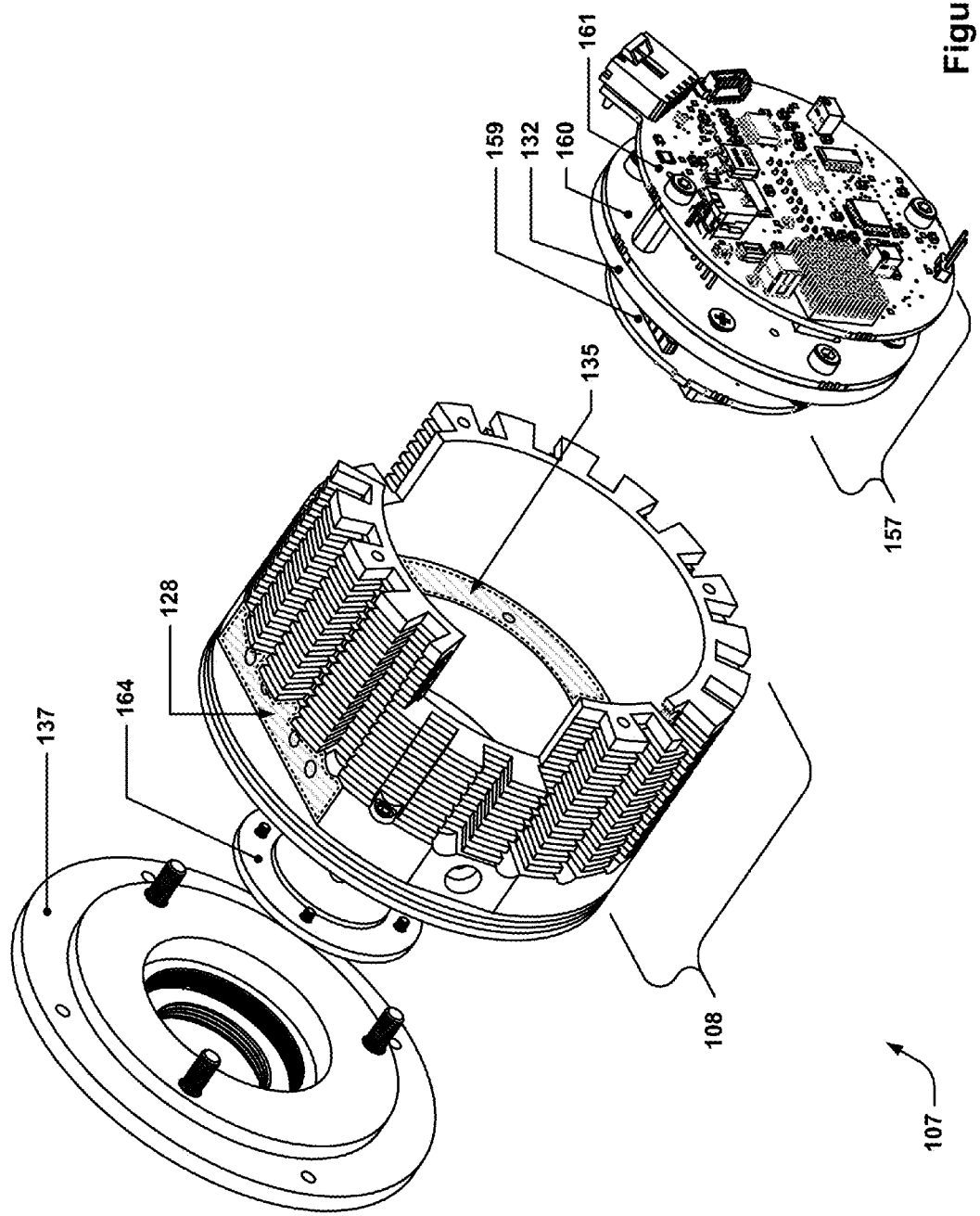

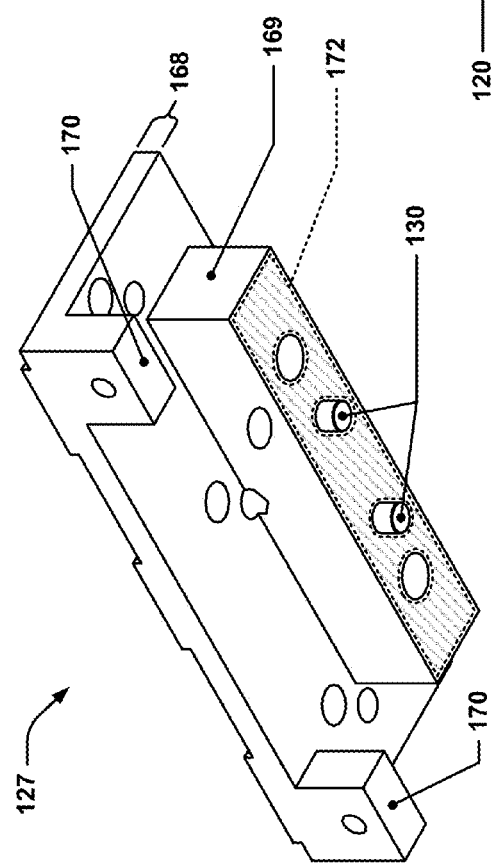
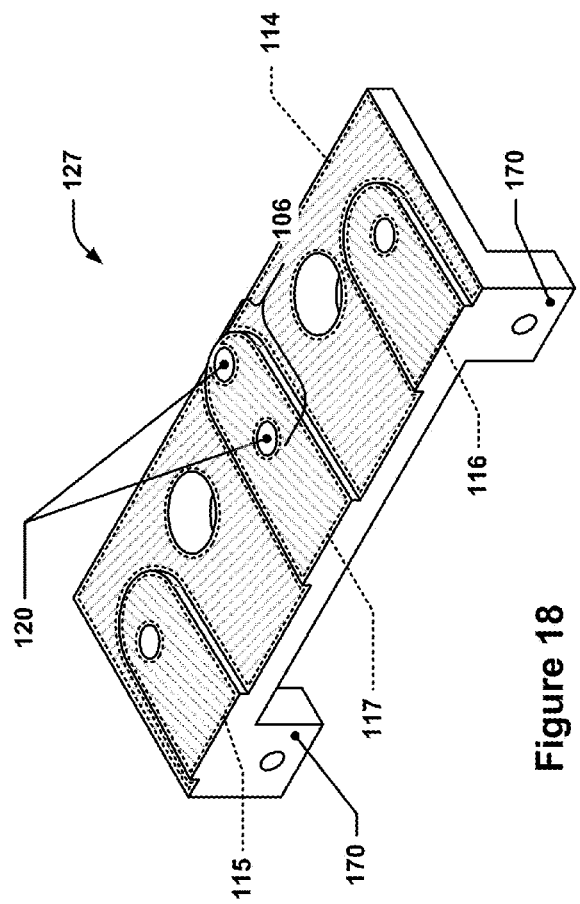

CAMERA ASSEMBLY AND SYSTEM FOR MOUNTING THEREOF

CROSS-REFERENCE TO RELATED APPLICATIONS

This application claims benefit of priority under 35 U.S.C. § 119(e) from U.S. Provisional Patent Application Nos. 62/307,214, filed on Mar. 11, 2016, which is hereby incorporated herein by reference in its entirety for all purposes.

TECHNICAL FIELD

This disclosure relates generally to imaging systems for molecular biology or genetics applications and, in particular, to imaging systems utilizing high-speed lenses with large apertures suitable for use in imaging gels or blots.

BACKGROUND

Imaging systems for molecular biology and genetics applications typically provide an optical magnification system, e.g., one or more lenses, that produce an image on a focal plane that is generally aligned with the imaging plane of an imaging sensor. Such imaging sensors are typically sold as self-contained camera units by their respective manufacturers, with the imaging sensor, associated electronics, and cooling systems housed within a housing. The housings typically have a threaded lens mounting feature, and the center of the imaging sensor is generally centered on the center of the threaded lens mount and positioned such that the focal plane of lenses that may be connected to the lens mount may generally align with the imaging plate of the sensor. One or more mounting features are typically located on the exterior surface of the housing to allow the camera unit to be mounted to, for example, a tripod or other support structure.

Such imaging systems are typically configured to receive a sample, e.g., a gel, blot, or other generally planar specimen, on a sample stage. The lens/camera unit system is generally configured so as to focus the lens on the sample stage to capture images of the sample.

SUMMARY

The present inventors have conceived of an imaging system for molecular biology or genetic analyses that utilizes a fixed-focal-length lens with a large aperture, e.g., having F-numbers of less than or equal to 1.4 (meaning that such lenses have a focal length that is less than or equal to the effective aperture of the lens), to capture images, including under very low lighting conditions. In the course of doing so, the present inventors determined that commercially available camera units required extensive post-installation adjustment in order to correct relatively minor misalignments that would typically be of little or no consequence in zoom lens imaging systems or other smaller-aperture camera systems. Such smaller-aperture imaging systems have a large depth of field, and thus minor misalignments between the lens center axis, the imaging sensor imaging plane, and the sample stage are unnoticeable since the large depth-of-field can absorb any such errors. The present inventors have determined that even small misalignments between the lens center axis, the imaging sensor imaging plane, and the sample stage may produce unacceptable image distortions in a fast-lens imaging system due to the very shallow depth of field of such lenses. Accordingly, the present inventors have conceived of a number of techniques and apparatuses that may be used in such fast-lens imaging systems to provide high-precision placement of optical and image-capture components requiring a minimal amount of post-installation adjustment in order to properly focus the imaging system.

In molecular biology and genetic analysis applications, a biological sample may be subjected to any of several techniques in which the composition of the sample is reflected in some form of generally planar media, e.g., gels or blots. For example, the molecules in a particular sample may be separated within a gel using a technique such as electrophoresis. By applying an electric field, the molecules of a sample may be caused to migrate through a planar gel; the larger/heavier molecules will move through the gel slower than the smaller/lighter molecules, resulting in a size-based spatial distribution of molecules across the gel. Other factors, such as molecular charge, may also affect the movement of molecules through the gel and thus the spatial distribution of the molecules. Once distributed, molecules may optionally be transferred to a blotting membrane or paper to form a blot. The spatially distributed molecules may then be labeled by adding a labelling agent/compound or agents/compounds that bind to the molecules of interest, and the resulting labeled gel or blot may be imaged to obtain a quantified estimate of the amounts of various molecules that are present in the sample. In some instances, this quantification may involve measuring the amount of light in particular wavelengths that is emitted by the labelled molecules—such light may be due to fluorescence, in which the gel or blot is exposed to light of a particular wavelength that stimulates photoemissions from the labelling compound, bioluminescence, in which the labelling compound may be a bioluminescent compound, and chemiluminescence, in which the labelling compound may produce light during a chemical reaction with the target molecules. The present inventors developed an imaging system that may be used to obtain images of gels or blots, such as those described above, in order to quantify the molecular makeup of such samples; the imaging systems in question may utilize a high-speed lens, as discussed below, in order to adequately capture the emitted luminescence in luminescence-based approaches (the amount of luminescence in chemiluminescence-based approaches may be quite small, e.g., invisible to the human eye). Such imaging systems may also be used for non-luminescent approaches, e.g., color staining or similar techniques.

In some implementations, an imaging system for molecular biology or genetic analysis may be provided. The imaging system may include a linear translation mechanism including one or more linear guides, a carriage configured to translate along a first axis along the linear guides, and a first mechanical interface feature located on the carriage. The imaging system may also include a camera unit that includes a camera barrel. The camera barrel, in turn may have an interior volume within the camera barrel, a lens mounting feature having a lens mount plane, and a second mechanical interface feature located on the exterior of the camera unit. The camera barrel may also include an imaging sensor that is located within the interior volume of the camera barrel. In such implementations, the imaging sensor may have a plurality of light-sensitive pixels arranged in a planar array that is parallel to the lens mount plane, the first mechanical interface feature and the second mechanical interface feature may interact so as to fix the camera unit in place relative to the carriage such that the first axis is perpendicular to the planar array of light-sensitive pixels, and there may be no positional adjustment mechanisms between the carriage and the camera unit.

In some such implementations, the camera unit may include a carriage-facing surface that faces towards the carriage, as well as a first raised boss and a second raised boss. The first raised boss and the second raised boss may protrude from the carriage-facing surface, and the first raised boss and the second raised boss may form part of the second mechanical interface feature. In such implementations, the first raised boss and the second raised boss may both be in compressive contact with the carriage and the first raised boss and the second raised boss may be machined so as to have a tolerance of ±0.02 degrees with respect to an axis normal to the planar array of light-sensitive pixels and a tolerance of ±0.03 mm of flatness with respect to one another.

In some further or alternative implementations, the imaging system may further include a fixed-focal-length lens, having an aperture with an f-number of at least 1.4 or lower, which may be mounted to the lens mounting feature.

In some further or alternative implementations, the imaging system may include at least two alignment shafts. In such implementations, the first mechanical interface feature may include at least two first alignment holes, each first alignment hole sized to receive a corresponding alignment shaft, and the second mechanical interface feature may include at least two second alignment holes, each second alignment hole corresponding in location to one of the first alignment holes and sized to receive the corresponding alignment shaft for the corresponding first alignment hole.

In some further such implementations, the alignment shafts may be in the form of shoulder screws with a threaded portion and a shoulder portion having a larger diameter than the threaded portion, the second alignment holes may be threaded holes sized to receive the threaded portion of the corresponding alignment shaft, and the first alignment holes may be sized to have the same diameter as the shoulder portion of the corresponding alignment shaft (or a diameter that is between 0 and 0.0005 inches larger than a diameter of the shoulder portion of the corresponding alignment shaft).

In some further or alternative implementations, the imaging system may include a mounting fixture. In such implementations, the camera barrel may have a cylindrical outer surface with a center axis, and the cylindrical outer surface may include a plurality of spaced-apart circumferential grooves that extend around the outer circumference of the camera barrel. In such implementations, the camera barrel may also include a mounting fixture surface that is parallel to the center axis and that defines a chord of the cylindrical outer surface, the mounting fixture surface may include at least two first fixture alignment features, the mounting fixture may include at least two second fixture alignment features as well as the second mechanical interface feature, the first fixture alignment features and the second fixture alignment features may interlock so as to fix the camera barrel in place relative to the mounting fixture, and there may be no positional adjustment mechanisms between the camera barrel and the mounting fixture.

In some further such implementations, the imaging system may further include a seal plate. In such implementations, the imaging sensor may be mounted to an imaging printed circuit board (PCB) that includes a plurality of electrically conductive pins that protrude from a side of the imaging PCB on the opposite side of the imaging PCB from the imaging sensor, the seal plate may have one or more through-holes, and each electrically conductive pin may protrude through one of the through-holes. The camera barrel may also include a ledge surface within the interior volume on which the seal plate rests; the ledge surface may be perpendicular to the mounting fixture surface to within a tolerance of ±0.25 degrees.

In some further or alternative such implementations, the mounting fixture may further include a carriage-facing surface that faces towards the carriage, a first raised boss and a second raised boss, the first raised boss and the second raised boss protruding from the carriage-facing surface, and a barrel-facing surface that faces towards the camera barrel. In such implementations, the first raised boss and the second raised boss may form part of the second mechanical interface feature and both be in compressive contact with the carriage. In such implementations, the first raised boss and the second raised boss may be machined so as to have a tolerance of ±0.5 degrees with respect to the barrel-facing surface and a tolerance of ±0.5 degrees with respect to one another.

In some further or alternative such implementations, the cylindrical outer surface may include a plurality of slots, each slot extending along a direction having a component parallel to the center axis, having a depth within ±6% of the average depth of the circumferential grooves, and intersecting with each of the circumferential grooves in the plurality of circumferential grooves. In some such implementations, each slot may extend along a direction parallel to the center axis.

In some further or alternative implementations, the lens mounting feature may be part of the camera barrel.

In some additional or alternative implementations, the lens mounting feature may be located in a plate that is located adjacent to the camera barrel, three adjustment screws may be located such that a threaded portion of each adjustment screw is threaded into a corresponding threaded hole located in either the plate or in the camera barrel and a bearing surface of each adjustment screw is in contact with a bearing surface of the other of the plate or the camera barrel, and the plate may be held against the camera barrel by a compression mechanism such that the adjustment screws are compressively loaded.

In some additional or alternative implementations, the imaging system may further include an enclosure defining a plenum volume. In such implementations, the camera unit may be located within the plenum volume, the enclosure may include a first port and a second port, and the camera unit may be interposed between the first port and the second port. In such implementations, the first port may be configured to connect the plenum volume with a convective cooling system source, and the second port may be configured to connect the plenum with a convective cooling system exhaust.

In some such implementations, the imaging system may also include a flexible cooling duct fluidically connected with the first port and a flexible exhaust duct fluidically connected with the second port.

In some alternative or further such implementations, the enclosure may have a side with a plurality of U-shaped slots milled in directions perpendicular to an edge of the side, a plurality of U-shaped bosses may exist proximate to the first mechanical interface feature and the second mechanical interface feature, and the U-shaped bosses and the U-shaped slots may intermesh to locate the enclosure relative to the camera unit.

In some alternative or further such implementations, the imaging system may further include a reflector assembly including a mirror having a reflective surface arranged at 45°±0.5° to the first axis.

In some alternative or further such implementations, the imaging system may also include a sample stage having a planar sample surface, the sample stage positioned beneath the reflector assembly and oriented such that the planar sample surface is parallel to the first axis.

BRIEF DESCRIPTION OF THE DRAWINGS

The included drawings are for illustrative purposes and serve only to provide examples of possible structures for the concepts disclosed herein. These drawings in no way limit any changes in form and detail that may be made by one skilled in the art without departing from the spirit and scope of the disclosed embodiments.

FIG. 2 depicts a side view of the imaging system of FIG. 1.

FIGS. 3, 4, and 5 depict simplified representations of an example linear translation mechanism.

FIG. 8 depicts an isometric view of an example camera unit according to some implementations discussed herein.

FIG. 9 depicts another isometric view of the example camera unit of FIG. 8.

FIG. 10 depicts a rear view of the example camera unit of FIG. 8.

FIG. 11 depicts a front view of the example camera unit of FIG. 8.

FIG. 12 depicts a top view of the example camera unit of FIG. 8.

FIG. 13 depicts a side view of the example camera unit of FIG. 8.

FIG. 16 depicts another isometric exploded view of the camera unit of FIG. 8.

FIG. 17 depicts an isometric view of an example of a mounting fixture that may be used to precision-mount the example camera unit of FIG. 8 within the imaging system of FIG. 1.

FIG. 18 depicts another isometric view of the example mounting fixture of FIG. 17.

Figure 1:
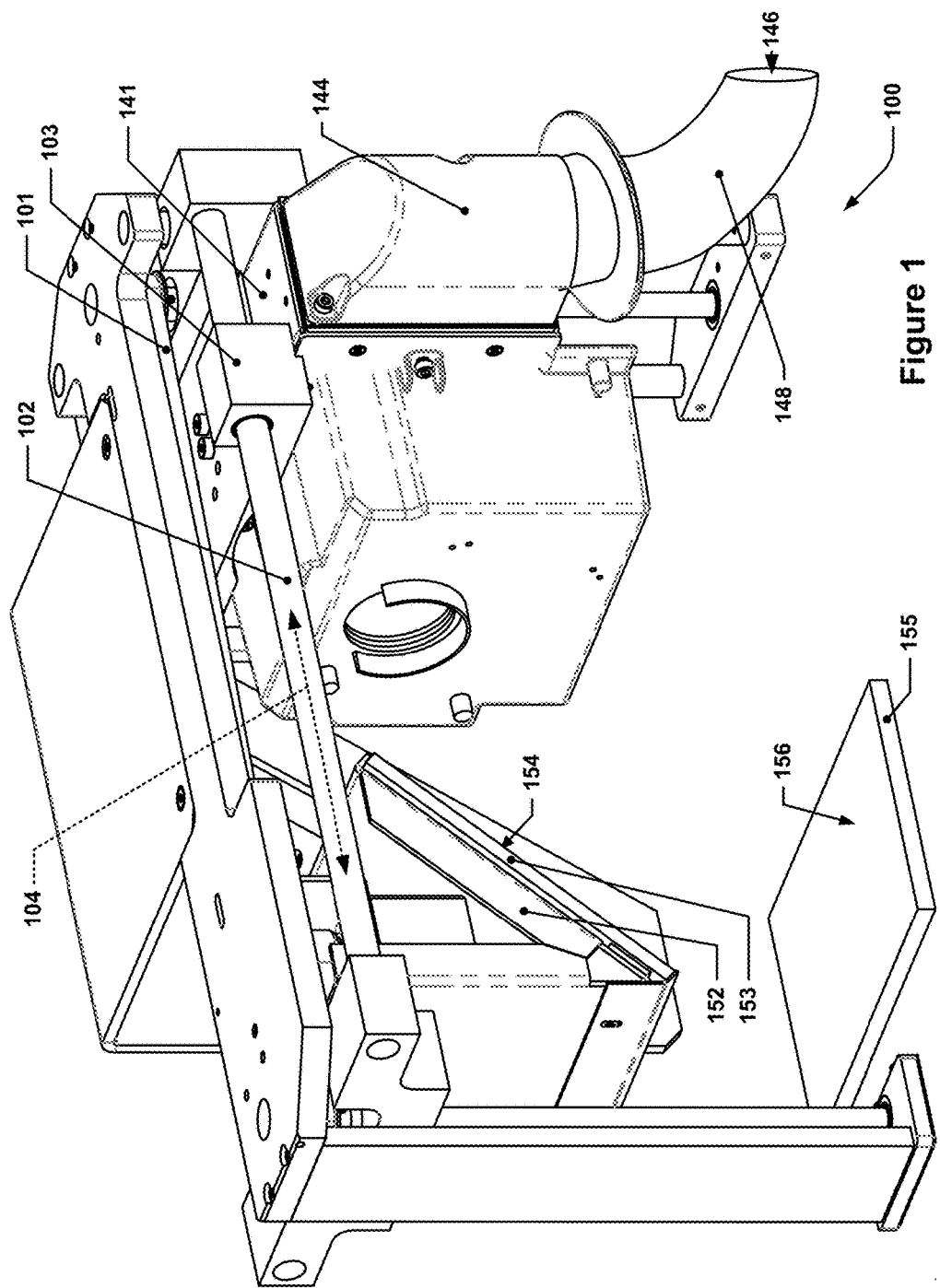
FIG. 1 depicts an off-angle view of an example of an imaging system according to some implementations discussed herein.

Throughout the drawings, the same reference numerals and characters, or reference numbers sharing the same last two digits, unless otherwise stated or suggested by the text or Figures, are used to denote like features, elements, components, or portions of the illustrated embodiments. Moreover, while the concepts herein will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments of concepts discussed herein will now be described with reference to the accompanying drawings. These concepts may, however, be embodied in many different forms, and should not be construed as limited to the embodiments set forth herein. Rather, these embodiments are provided so that this disclosure will be thorough and complete, and will fully convey the scope of the concepts disclosed herein to those skilled in the art.

It will be understood that when an element is referred to as being "connected" or "coupled" to another element, it can be directly connected or coupled to the other element, or intervening elements may be present; the term "coupled" may also refer to two elements that are coupled via a contiguous structure, e.g., a single, molded part may have a "tab" that is coupled with a "body." Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

As mentioned above, the present inventors have developed a fast-lens imaging system. As used herein, the term "fast lens" refers to lenses having a f-number less than or equal to 1.4, meaning that their focal lengths are less than or equal to the lens aperture diameter of such lenses. In their development, the present inventors determined that the typical imaging system paradigm, i.e., purchasing a stock camera unit with a CCD contained within a housing having a lens mount and then mounting that stock camera unit into the imaging system, resulted in an assembly requiring extensive post-installation adjustment of the camera unit in order to properly focus and calibrate the imaging system. As such, the present inventors determined that a new approach to camera unit design would be beneficial, as it would be possible to drastically decrease or, in some cases, completely eliminate camera unit alignment and/or positioning adjustment in such systems.

FIG. 1 depicts an off-angle view of an example of an imaging system according to some implementations discussed herein. In FIG. 1, the imaging system 100 includes a number of components, including a sample stage 155 having a planar sample surface 156, a reflector assembly 152 having a mirror 153 with a reflective surface 154 oriented at a 45° angle ±0.5° or ±0.25° with respect to the planar sample surface 156 and/or a first axis 104, and an imaging subassembly that includes an enclosure 141 that contains a camera unit (not shown in FIG. 1). The imaging subassembly may also include linear translation mechanism that may include a carriage 103 that is configured to translate linearly along the first axis 104, e.g., by sliding along linear guides 102 (a second linear guide 102 is provided as well, although not visible in FIG. 1 as it is located on the back side of imaging system 100). A linear actuator or drive may provide a mechanism for translating the carriage 103 along the first axis 104.

FIG. 2 depicts a side view of the imaging system of FIG. 1. As can be seen, there are also vertical guides 165 along which the linear guides 102 may be slid in order to raise or lower the linear guides 102. A slotted track 167, which may be oriented at an angle with respect to the first axis 104, may engage with a roller 166 on the carriage 103 such that when the linear guides 102 are raised and lowered vertically, e.g., by a linear actuator or ball screw driven by a motor (not shown), the slotted track 167 causes the carriage 103 (and attached enclosure 141, with a camera unit within) to translate along the linear guides 102 in a horizontal direction. FIGS. 3, 4, and 5 depict simplified representations of an example linear translation mechanism (similar to that shown in FIG. 2) showing such bi-axial translation (a ball screw actuator 173 may drive the horizontal linear guides up and down along a set of vertical guides; at the same time, a sloped slotted track may engage with a roller on the carriage that causes the carriage to translate to the right when the horizontal linear guides are lowered, and to translate to the left when the linear guides are raised). In this manner, the carriage 103 may be moved closer to the sample stage 155 and the reflector assembly 152 (which also moves with the linear guides 102) simultaneously using only one drive component. In other implementations, separate independent drives may be used to provide such bi-axial translation. In yet other implementations, single-axis translation mechanisms may be used to provide only uniaxial translation, e.g., as may be the case in an imaging system 100 that does not utilize a reflector assembly 152 but instead has a camera unit that is pointed directly at the sample stage 155.

Figure 6:
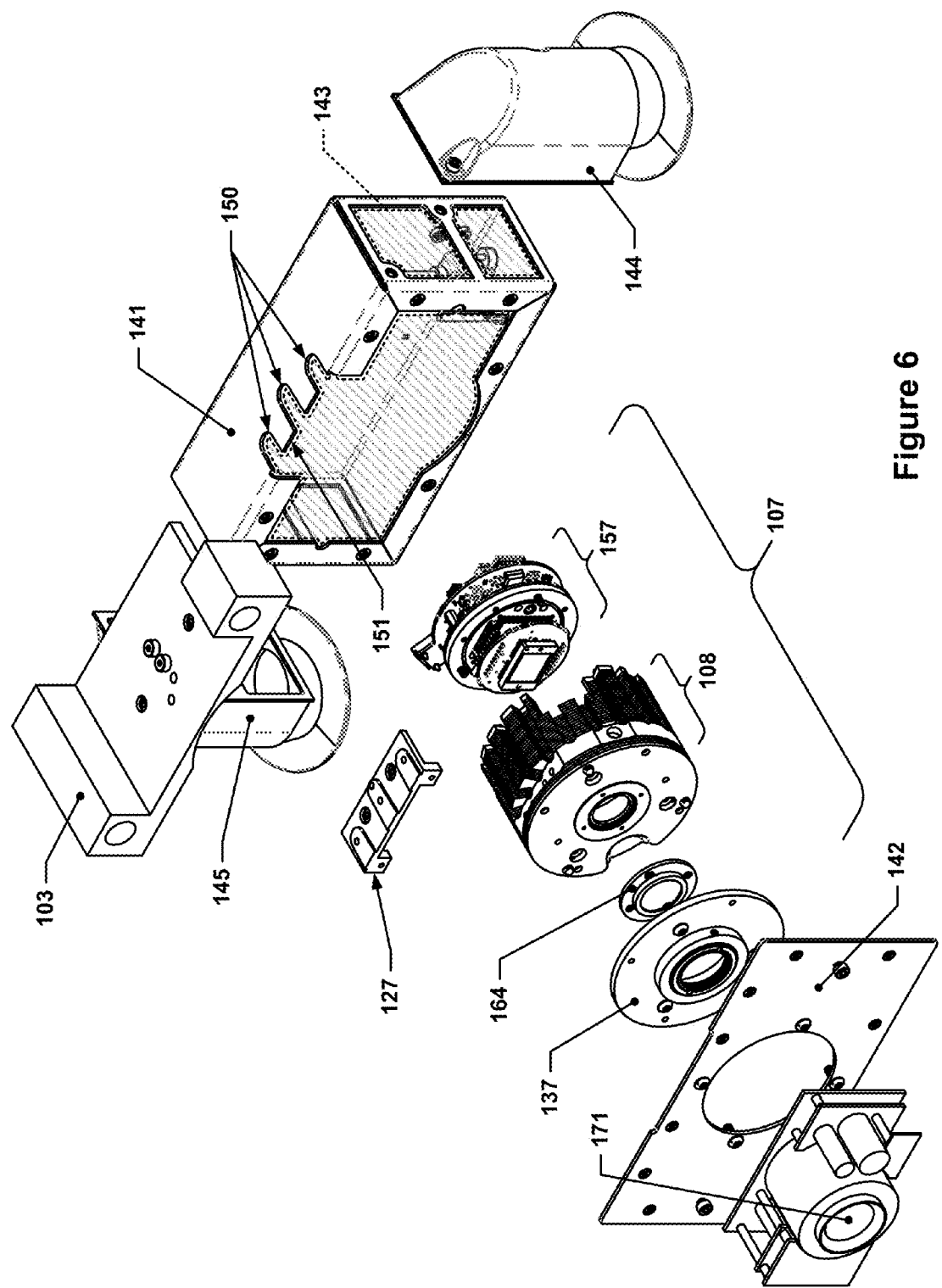
FIG. 6 depicts an isometric exploded view of a subportion of the imaging system of FIG. 1.
Figure 7:
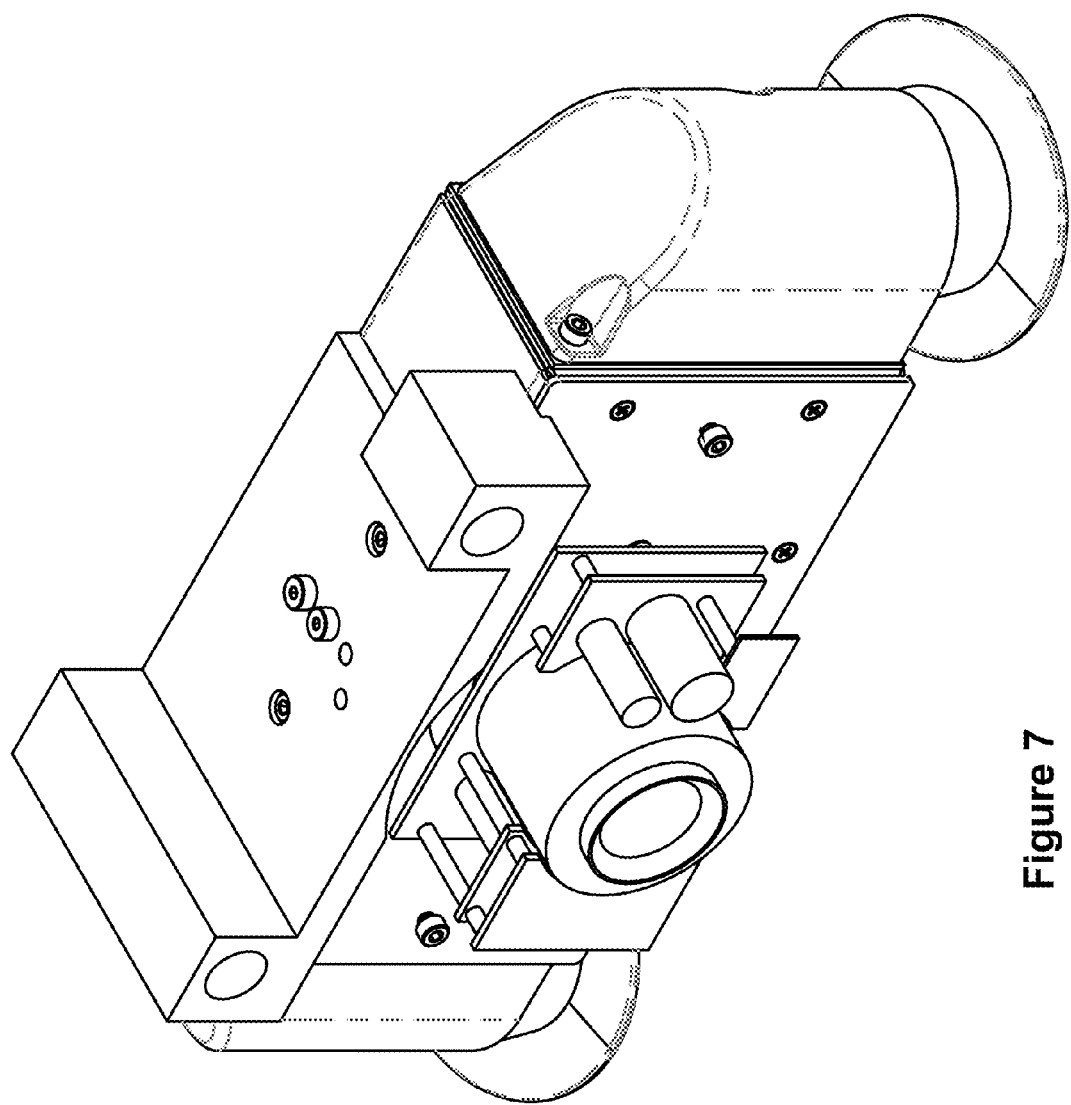
FIG. 7 depicts an unexploded isometric view of the subportion of the imaging system of FIG. 6.

FIG. 6 depicts an isometric exploded view of a subportion of the imaging system of FIG. 1. FIG. 7 depicts an unexploded isometric view of the subportion of the imaging system of FIG. 6. As can be seen in FIG. 6, the enclosure 141 includes a camera unit 107, a first port 144, and a second port 145. The camera unit 107 may be located within a plenum volume 143 of the enclosure 141; the enclosure 141 may also include an enclosure lid 142 that may close off one or more open faces of the enclosure 141 so as to create a generally enclosed volume within which the camera unit 107 may be housed. The first port 144 and the second port 145 may be used to route a cooling fluid, e.g., air, through the enclosure 141. For example, the first port 144 may be connected with a convective cooling system source 146 (not shown, but flow from source is indicated in FIG. 1 by arrow 146), e.g., a facility dry air source, an intake, a fan or blower unit (to push air through the enclosure), etc., by a flexible cooling duct 148 (shown in FIG. 1) and the second port 145 may be connected with a convective cooling system exhaust, e.g., an outlet into the ambient environment, a fan or suction unit (to pull air through the enclosure 141), or other type of exhaust (flexible exhaust duct and exhaust system not shown, but generally similar to the cooling-related components discussed above). Cooling fluid that is flowed through the enclosure in this manner may flow around the camera unit 107, where it may convectively cool the camera unit 107 before exiting the enclosure 141 via the second port 145.

The enclosure 141 may also optionally have features that allow the enclosure 141 to interface with features on the camera unit 107, such as U-shaped slots 150 in a side 151 of the enclosure 141.

The camera unit 107 may include a camera barrel 108 and camera electronics 157. The camera unit 107 may optionally also include a plate 137, a window retainer 164 (which may hold a window, not separately indicated, in place), and a mounting fixture 127.

FIG. 8 depicts an isometric view of an example camera unit according to some implementations discussed herein. FIG. 9 depicts another isometric view of the example camera unit of FIG. 8. As can be seen, the camera unit 107 includes a camera barrel 108 that has a cylindrical outer surface 124. The cylindrical outer surface 124 may have a number of spaced-apart circumferential grooves 126 (in this case, there are more than 12 such grooves, although other implementations may have as few as 5 grooves or up to 30 grooves) that extend into it, as well as slots 136 (in this example, there are a total of 20 such slots, although other implementations may have as few as 4 slots or as many as 28 slots; the addition of such slots in the depicted design was found to increase the cooling rate such that there was a corresponding 20-25% drop in dark current, which directly impacts the level of noise in the imaging sensor; in low-lighting conditions, such performance improvements may result in significantly higher quality data). These grooves and slots may define a large number, e.g., ~200, annular-sector shaped cooling fins that may facilitate convective cooling of the camera unit 107. It is to be understood that while the slots 136 that are shown extend along a direction parallel to the center axis of the cylindrical outer surface, the slots 136 may alternatively extend along helical paths along the cylindrical outer surface 124, much like the flutes of a drill bit, although the manufacturing cost of such an arrangement is likely higher. In some implementations, the depths of the slots 136 may be within ±6% of the depth of the circumferential grooves 126. In addition to such features, the camera barrel 108 may also include a mounting fixture surface 128, which may be machined so as to be a chord surface of the cylindrical outer surface 124. The mounting fixture surface 128 may include a first fixture alignment feature 129, e.g., two precision-machine holes for receiving locating pins on a mating part, that may be used to locate a mating part relative to the camera barrel 108 in a high-precision manner. The mounting fixture surface 128 may also form part of the first fixture alignment feature 129, e.g., the mounting fixture surface 128 may be machined to a high degree of precision so as to ensure that it is within ±0.02 degrees of parallel with a center axis 125 of the camera barrel 108. By recessing the mounting fixture surface 128 into the cylindrical outer surface 124, the entire camera barrel 108 may be machined from a piece of cylindrical stock, e.g., aluminum alloy round stock, in an economical manner.

The camera unit 107 may also include a plate 137 that may include a lens mounting feature 110, which may be a threaded lens mount or other standard lens mount interface. The lens mounting feature 110 may inherently define a lens mount plane 111, as well as potentially the center axis 125. The lens mount plane 111 is perpendicular to the optical centerline of whatever lens, e.g., such as lens 171 (see FIGS. 6 and 7), is mounted to the lens mounting feature 110, and the center axis 125 may be aligned with the optical centerline of whatever lens is installed in the lens mounting feature 110. Generally speaking, the lens mount plane 111 is parallel to a planar array of light-sensitive pixels that are part of the imaging sensor (not shown in this view, but visible in later views) of the camera unit 107. The plate 137, and thus the lens mounting feature 110, may be separate from the camera barrel 108 so as to allow for fine-tuning of the alignment of the lens optical centerline with the center axis 125. For example, the camera barrel 108 may include two or three adjustment screws that may be used to increase or decrease the distance between the plate 137 and the camera barrel 108 at various locations, thereby changing the relative angle between the plate 137 and the surface of the camera barrel 108 facing the plate 137. If only two adjustment screws are used, a third point of contact, and thus stability, may be provided by a fixed-length pin or other non-adjustable contact point. The plate 137 may be pressed into contact with such adjustment screws (and fixed-length contact point, if used) by a compressive load exerted on the plate 137, e.g., by a compression mechanism 140 such as a set of screws that thread into the camera barrel 108, as shown in FIG. 8 (adjustment screws are indicated in later Figures). In some implementations, if sufficient precision is used in machining the camera barrel 108, the lens mounting feature 110 may be machined directly into a surface of the camera barrel 108, with no adjustment mechanism or plate 137.

As can be seen in FIG. 9, the camera barrel 108 may have an interior volume 109, which is sized to receive camera electronics 157 (an input/output (I/O) printed circuit board (PCB) 161 of the camera electronics 157 is visible here). The interior volume 109 may be cylindrical, as shown, in order to keep manufacturing costs low—other interior volume cross-sectional shapes are possible as well, e.g., square cross-sections, but such shapes may introduce additional manufacturing complexity with little or no performance benefit.

The following Figures provide additional views of the camera unit 107. FIG. 10 depicts a rear view of the example camera unit of FIG. 8. FIG. 11 depicts a front view of the example camera unit of FIG. 8. FIG. 12 depicts a top view of the example camera unit of FIG. 8. FIG. 13 depicts a side view of the example camera unit of FIG. 8.

As can be seen in FIG. 10, there are three adjustment screws 138, in this case, ball-tip or round-tip, socket-head set screws, that engage with the plate 137 in order to allow for precise tuning and alignment of the optical centerline of the lens that is eventually mounted in the lens mounting feature 110 with the center axis 125.

Figure 14:
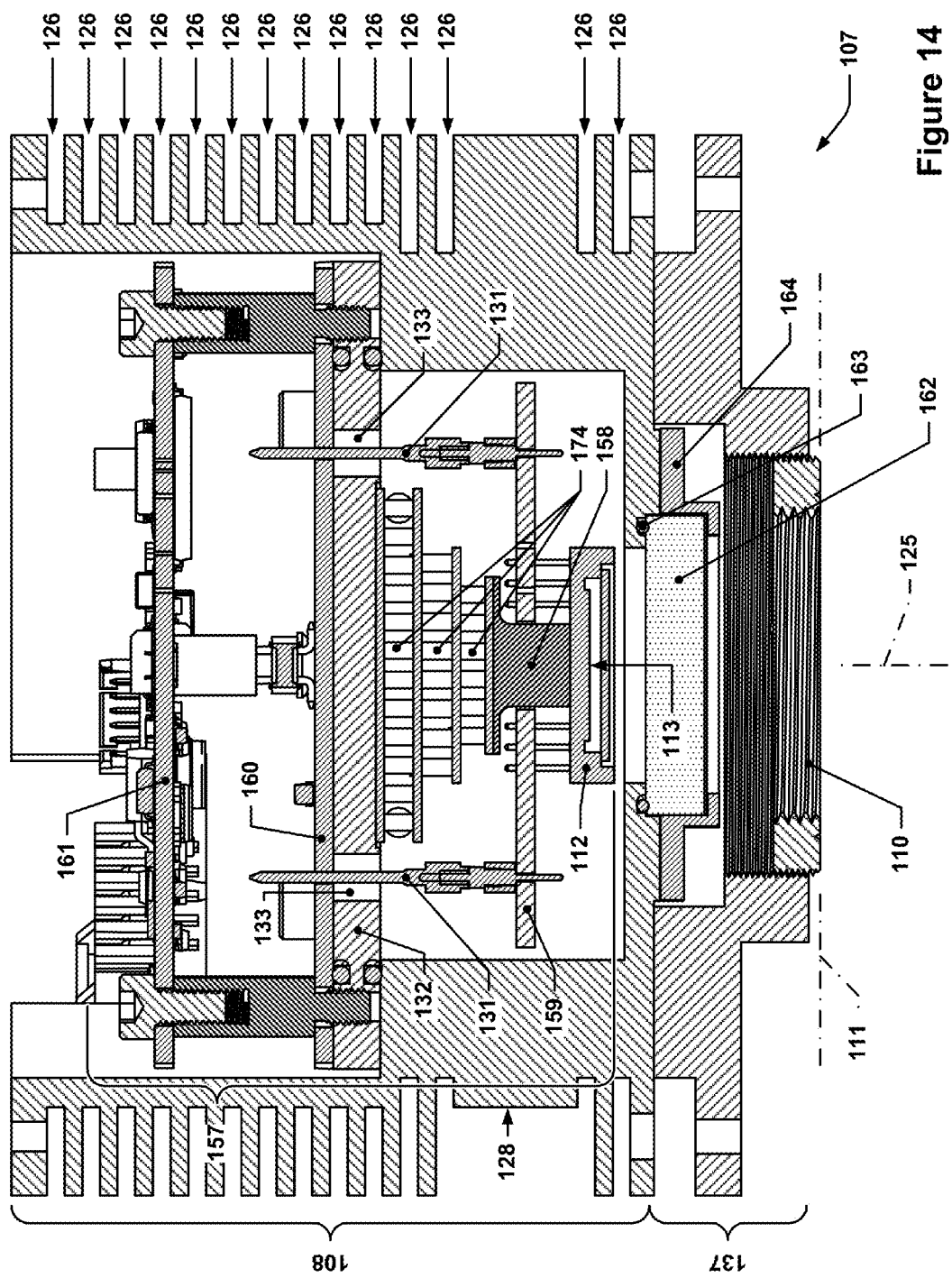
FIG. 14 depicts a section view of the example camera unit of FIG. 8.

FIG. 14 depicts a section view of the example camera unit of FIG. 8. In FIG. 14, additional details are visible, such as the camera electronics 157, which may include a series of PCBs, such as the I/O PCB 161, a bulkhead PCB 160, and an imaging PCB 159. The I/O PCB 161 may serve as an interface between the camera unit 107 and other, external hardware, such as a power supply and/or personal computer (not shown). The bulkhead PCB 160 may, in combination with a seal plate 132, provide for a hermetically sealed bulkhead that may seal off a portion of the interior volume 109 of the camera barrel 108. An imaging sensor 112 with a planar array 113 of light-sensitive pixels may be located within this sealed-off portion of the interior volume 109; the sealed-off portion may be purged of ambient atmospheric air during the product process and filled with argon or other low-thermal-conductivity, inert, gas to prevent condensation on the imaging sensor 112 or other surfaces of the camera unit 107. The imaging sensor 112 may be connected electrically to the imaging PCB 159, which may, by way of a series of long electrically conductive pins 131 or socket-and-pin assemblies (as shown), communicate electrically with the bulkhead PCB 160. Such electrically conductive pins may pass through a through-hole 133 that is machined or otherwise formed in the seal plate 132 before passing through solder connection holes in the bulkhead PCB 160, where each pin may be soldered to the bulkhead PCB 160. The bulkhead PCB 160 may be bonded to, or simply pressed against, the seal plate 132 and one or more compressive seals, e.g., o-rings (such as are visible near the outer perimeter of the seal plate 132), in order to provide an air-tight seal. The penetrations through the bulkhead PCB 160 may be sealed by virtue of the solder that bonds the electrically conductive pins 131 to the bulkhead PCB 160. The seal plate 132, which may be machined from aluminum or other comparably high-thermal conductivity material, may also provide a conductive heat flow path to conduct heat generated by the imaging sensor 112 to the camera barrel 108, where it may be convectively removed by cooling fluid that flows past the cooling fins provided by the circumferential grooves 126 and the slots 136. A heat pipe 158 and thermoelectric cooler (TEC) 174 may pull the heat generated by the imaging sensor 112 from the imaging sensor 112 and distribute such heat in a generally uniform manner across the seal plate 132 so as to increase heat flow from the imaging sensor 112 to the seal plate 132.

The camera barrel 108 may have an aperture through which the imaging sensor 112 may be exposed to light; this aperture may be sealed by a window 162, which may be transparent to one or more wavelengths of light and, in many cases, may be optically transparent to most or all wavelengths of light. The window 162 may be held in place by a window retainer 164, and sealed against the camera barrel 108 by a window seal 163.

Figure 15:
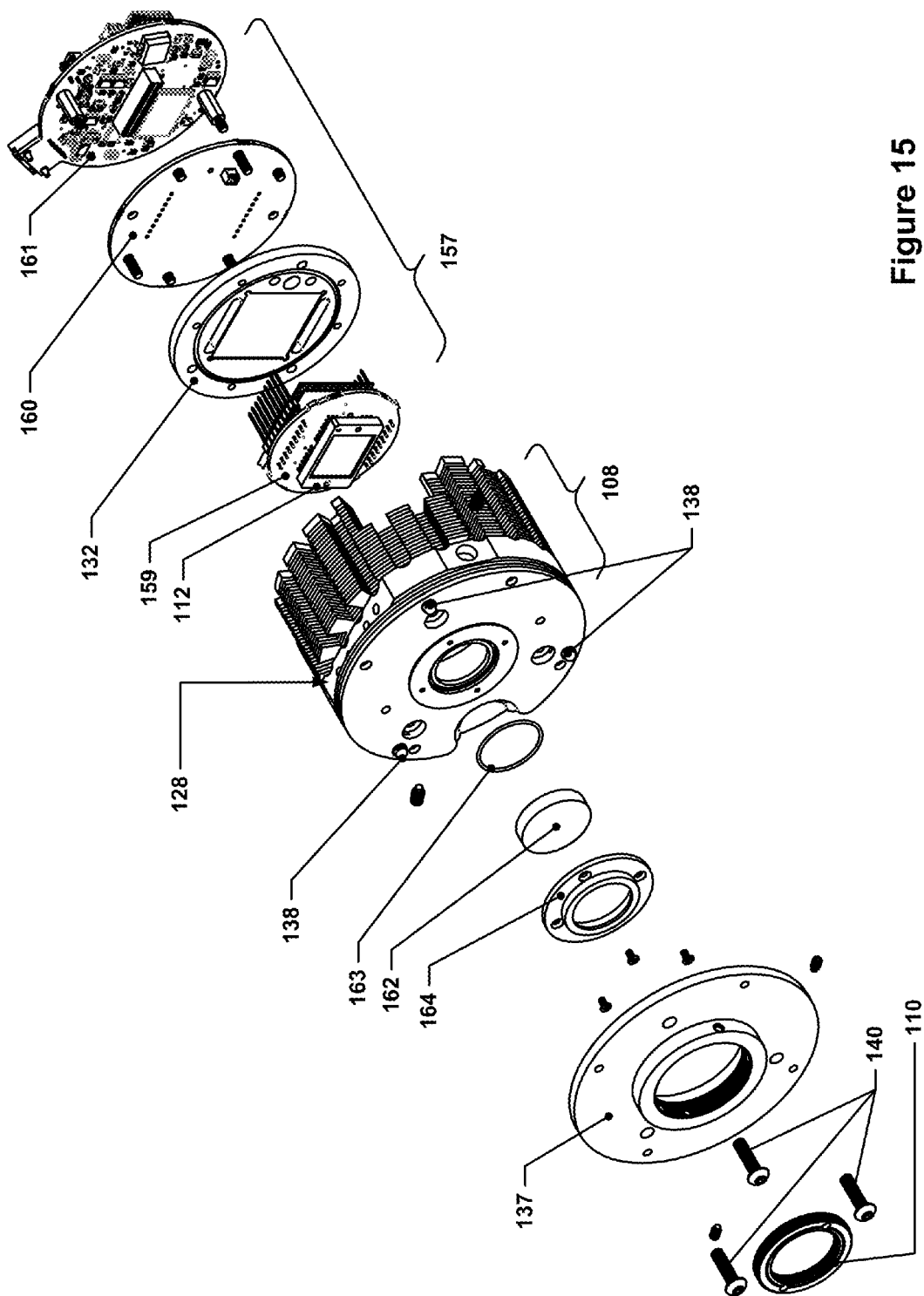
FIG. 15 depicts an isometric exploded view of the camera unit of FIG. 8.

FIG. 15 depicts an isometric exploded view of the camera unit of FIG. 8. FIG. 16 depicts another isometric exploded view of the camera unit of FIG. 8. As can be seen, the camera unit 107 is constructed such that there are relatively few components between the first mounting fixture surface 128 and the imaging sensor 112. In this particular example, the imaging sensor 112 rests on top of the heat pipe 158, which is, in turn, in contact with the TEC 174, which, in turn, acts as a heat pump and causes heat from the imaging sensor 112 to flow into the seal plate 132, which is then clamped to a ledge surface 135 (see FIG. 16) using several screws, allowing the heat to be conducted into the camera barrel 108. The only remaining component between these interfaces and the first mounting fixture surface 128 is the camera barrel 108 itself. In some implementations, the ledge surface 135 may be perpendicular to within ±0.25 degrees of the mounting fixture surface 128 to facilitate alignment of the imaging sensor with the lens mount feature. If the imaging sensor 112/seal plate 132 assembly is constructed and assembled so as to precisely align the planar array 113 so as to be parallel to the annular outer surface of the seal plate 132 that interfaces with the ledge surface 135, which may be done using fixtures/jigs before assembling the remainder of the camera unit 107, then only two surfaces, the mounting fixture surface 128 and the ledge surface 135, need to be held to high tolerances relative to one another in order to ensure that the mounting fixture 127 is sufficiently aligned with the planar array 113 of light-sensitive pixels.

FIG. 17 depicts an isometric view of an example of a mounting fixture that may be used to precision-mount the example camera unit of FIG. 8 within the imaging system of FIG. 1. FIG. 18 depicts another isometric view of the example mounting fixture of FIG. 17. As can be seen from FIG. 17, which shows the side of the mounting fixture 127 that faces towards the camera barrel 108 when installed, the mounting fixture 127 may, for example, have a base 168, e.g., a flat plate, that includes a raised portion 169 that terminates in a barrel-facing surface 172 that contacts the mounting fixture surface 128 when the mounting fixture 127 is assembled with the camera barrel 108. The barrel-facing surface 172 may include a second fixture alignment feature 130, which, in this example, includes two precision-ground locating pins that have been inserted or pressed into corresponding holes in the mounting fixture 127. The second fixture alignment feature 130 may interlock with the first fixture alignment feature 129 that is part of the mounting fixture surface 128 in order to orient the mounting fixture 127 relative to the camera barrel 108. The base may also include one or more mounting tabs 170 that may include features, e.g., threaded holes or nut plates, to allow the enclosure 141 to be connected with the mounting fixture 127 using, for example, screws.

The mounting fixture 127 may also include features for mounting and aligning the mounting fixture 127 (and attached camera barrel 108) to the carriage 103. For example, in FIG. 18, a carriage-facing surface 114 of the mounting fixture 127 may be seen. The carriage may, for example, include a first mechanical interface feature 134 (not shown here, but see FIG. 19) having, for example, a plurality of first alignment holes that may interface with a second mechanical interface feature 106, which, in this example implementation, includes two second alignment holes 120. In this example, the second alignment holes 120 are threaded so as to be able to receive shoulder screws or other precision-ground shafts, although the second alignment holes 120 may also be smooth-walled so as to receive ground pins, similar to the pins used in the example second fixture alignment feature 130 discussed earlier.

As can be seen, the carriage-facing surface 114 may include several raised bosses, e.g., a first raised boss 115, a second raised boss 1AA16, and a third raised boss 117. These raised bosses, which in this example are U-shaped, may not only provide for a gap between the carriage 103 and the base 168 of the mounting fixture 127, thereby allowing, for example, a wall of the enclosure 141 with U-shaped slots, in this example, to be sandwiched between the mounting fixture 127 and the carriage 103, but may also serve as a lower-cost interface to ensure proper alignment between the carriage 103 and the camera unit 107. For example, the third raised boss 117 may be machined such that it is slightly lower than the first raised boss 115 or the second raised boss 116, even taking into account manufacturing tolerances, thereby causing only the first raised boss 115 and the second raised boss 116 to be in contact with the carriage 103, while the third raised boss 117 may be separated from the carriage by a small gap. The third raised boss may also, for example, include the second alignment holes 120, as depicted in this example, although in other implementations, such second alignment holes 120 may be located in the first raised boss 115 and/or the second raised boss 116, and the third raised boss may be omitted entirely. Thus, in this implementation, the mounting fixture would be located in the X- and Y-directions (directions orthogonal to the center axes of the second alignment holes 120) by the second alignment holes 120, and in the Z-direction by contact between the carriage 103 and the first raised boss 115 and the second raised boss 116. Moreover, the interface between the first alignment holes on the carriage 103 and the second alignment holes 120 would prevent rotational movement of the camera unit 107 about the Z-axis, and the contact between the carriage 103 and the first raised boss 115 and the second raised boss 116 would prevent rotational movement of the camera unit 107 about the X- and Y-axes. In some implementations, the first raised boss 115 and the second raised boss 116 may be manufactured so as to have, when assembled into the completed camera assembly, a tolerance of ±0.02 degrees with respect to the central axis 125 and a flatness tolerance of ±0.03 mm with respect to one another.

While the first raised boss 115, the second raised boss 116, and the third raised boss 117 are optional, e.g., they could be omitted and the features in each raised boss located instead in the carriage-facing surface 114 directly, the entire carriage-facing surface 114 may need to be machined to a high degree of flatness if the raised boss features are not included, which may be much more expensive. If the mounting fixture is constructed as shown, i.e., with the raised bosses, only the first raised boss 115 and the second raised boss 116 may need to be machined to precise tolerances relative to the barrel-facing surface 172 to ensure proper rotational alignment between the carriage 103 and the camera unit 107 about the X- and Y-axes. This reduces cost, both in terms of machining and later metrology/inspection of the machined features.

Figure 19:
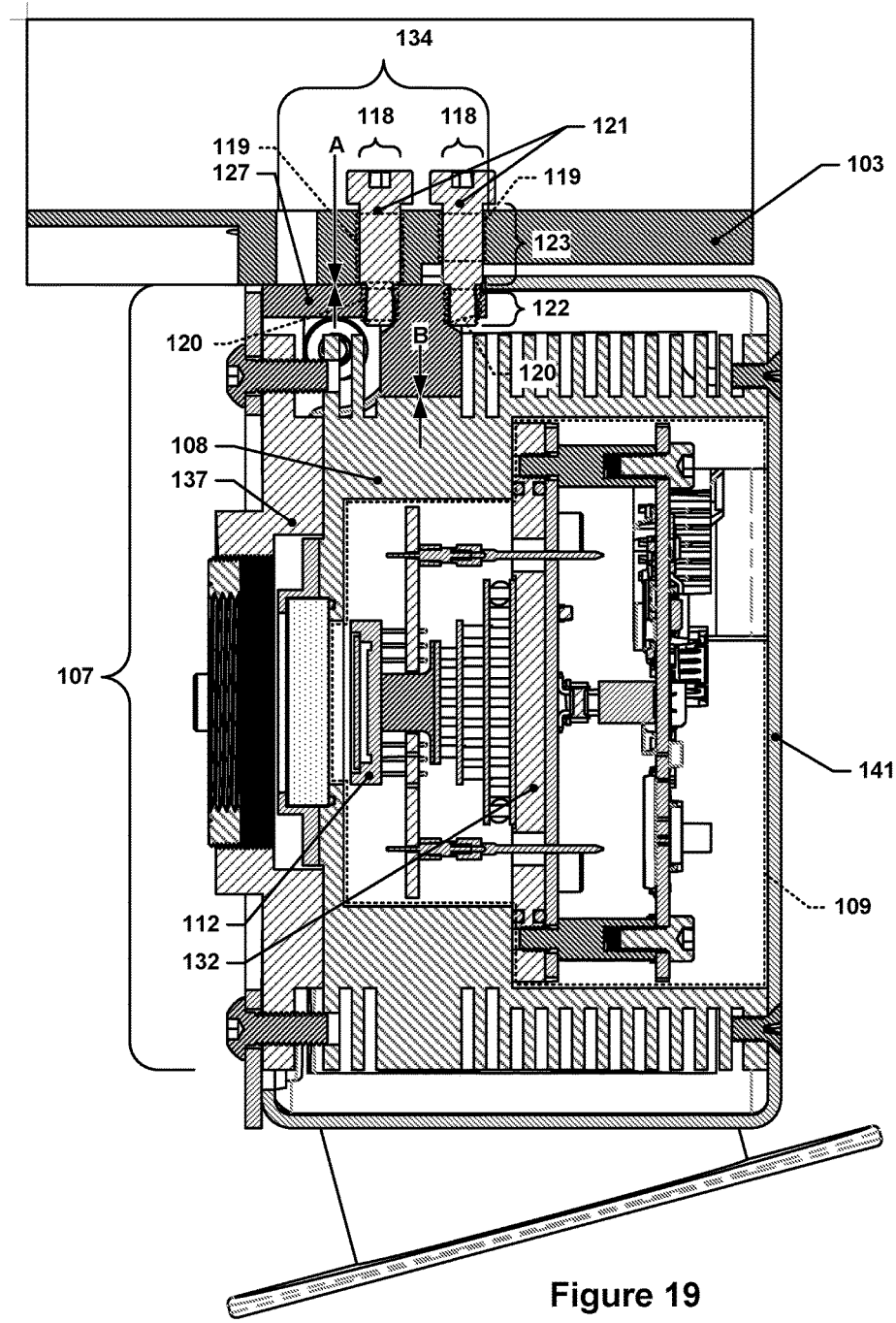
FIG. 19 depicts a section view of the subportion of the imaging system shown in FIG. 6.
Figure 20:
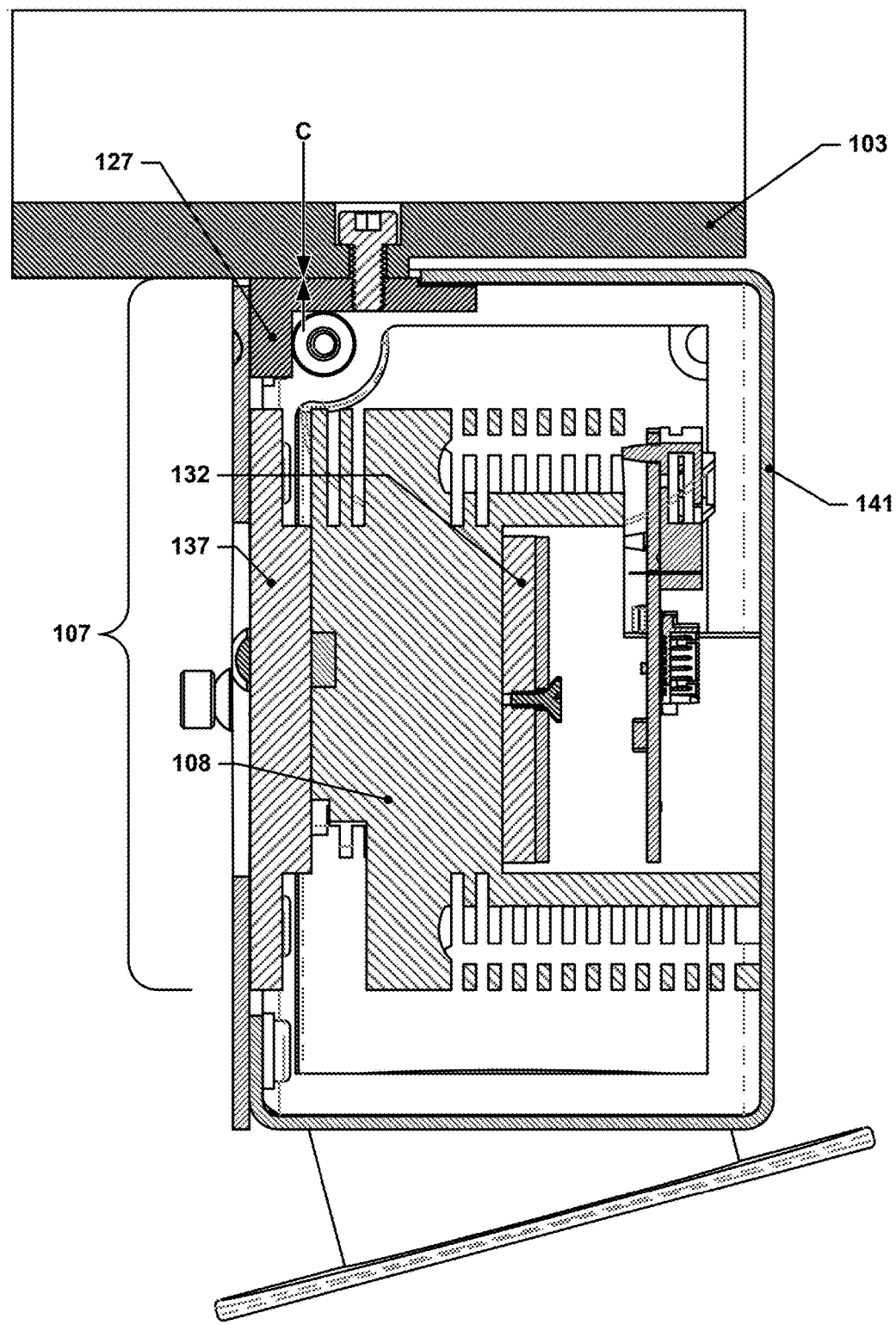
FIG. 20 depicts another section view of the subportion of the imaging system shown in FIG. 6.

FIG. 19 depicts a section view of the subportion of the imaging system shown in FIG. 6. FIG. 20 depicts another section view of the subportion of the imaging system shown in FIG. 6. FIG. 19 depicts a section that passes through the center axis 125, whereas FIG. 20 depicts a section that passes through the first raised boss 115.

As can be seen, the carriage 103 may include a first mechanical interface feature 134 that includes plurality of first alignment holes 119—in this example, three first alignment holes 119 are provided, but only two are used—the remaining first alignment hole (not indicated, but visible) may be used in other camera unit mounting configurations, if desired. Also visible is the mounting fixture 127, which may include the second mechanical interface and features thereof, e.g., the second alignment holes 120, which, in this example, are threaded holes. The first mechanical interface or the second mechanical interface may include features that interlock with corresponding features in the other mechanical interface, e.g., an alignment shaft 118 may be part of one mechanical interface and interlock with features of the other mechanical interface.

In the depicted implementation, the alignment shafts 118 are provided by shoulder screws 121, which may have a precision-ground shoulder portion 123, as well as a threaded portion 122. The threaded portion 122 of each shoulder screw 121 may engage with the threaded second alignment holes 120 so as to fix the shoulder screws 121 in place relative to the mounting fixture 127. As noted earlier, the third raised boss 117 may be separated from the carriage 103 by a small gap, e.g., such as at the location "A" (the gap is quite small, e.g., a few thousandths of an inch, and not actually discernible at the depicted scale), in contrast to location "B," where the mounting fixture 127 is compressed against the mounting fixture surface 128 of the camera barrel 108 and location "C," where the barrel-facing surface 172 is compressed against the mounting fixture surface 128, i.e., where no gap exists. As can be seen, the shoulder screws 121 may act more as pins than as compressive members, as the screw heads do not bear directly on the carriage 103, which could potentially cause the mounting fixture 127 to flex, leading to misalignment between the camera unit 107 and the carriage 103.

The various concepts embodied in the above-discussed implementation may be practiced or implemented in a variety of ways in order to achieve the imaging system envisioned by the present inventors. For example, as mentioned previously, a separate plate 137 may be unnecessary, and some implementations may feature a camera barrel 108 that incorporates the lens mounting feature 110 directly into the camera barrel 108 as opposed to in a separate plate 137 that allows for adjustment of the lens mounting feature 110 relative to the camera barrel 108. In some other or additional implementations, the mounting fixture 127 may be omitted and some or all of the features of the mounting fixture 127 may be machined directly into the camera barrel 108. Such an approach may eliminate one of the contact interfaces requiring tight tolerancing in order to properly align the camera unit with the carriage, but may, at the same time, require additional machining and/or larger starting material due to a more complex part shape. For example, the camera barrel 108 that is depicted in the example implementation discussed herein may be machined from a piece of round stock that is the same diameter as the camera barrel 108. However, if the features provided by the mounting fixture 127 were integrated directly into the camera barrel 108, it would be necessary to start with a larger diameter piece of round stock to accommodate the portions of the mounting fixture that protrude beyond the limits of the cylindrical outer surface 124.

The camera barrel 108, mounting fixture 127, plate 137, and seal plate 132 may be manufactured from any suitable material, e.g., aluminum alloy. Various other components, such as screws and linear guides, may be manufactured from steel or other suitable material, e.g., high-hardness and high-strength materials.

Generally speaking, the camera barrel/mounting fixture/carriage interfaces described herein may be particularly notable due to the deliberate omission of any positional adjustment mechanisms that would allow the precise positioning and alignment of these components relative to one another to be adjusted. In short, these components may be assembled in only one, fixed configuration, thereby simplifying the assembly process by eliminating potentially time-consuming adjustment steps. This is directly contrary to how imaging systems are typically constructed, since such systems typically routinely incorporate adjustment mechanisms for maximum tunability.

Although several implementations have been described in detail herein with reference to the accompanying drawings, it is to be understood that this disclosure is not limited to these precise embodiments or implementations, and that various changes and modifications may be effected therein by one skilled in the art without departing from the scope or spirit of the disclosure as defined in the appended claims.

What is claimed is:

1. An imaging system comprising:
a linear translation mechanism including:
one or more linear guides,
a carriage configured to translate along a first axis along the linear guides, and
a first mechanical interface feature located on the carriage;
a camera unit, the camera unit including:
a camera barrel,
an interior volume within the camera barrel,
a lens mounting feature having a lens mount plane,
a second mechanical interface feature located on the exterior of the camera unit; and
an imaging sensor located within the interior volume of the camera barrel, wherein:
the imaging sensor has a plurality of light-sensitive pixels arranged in a planar array that is parallel to the lens mount plane,
the first mechanical interface feature and the second mechanical interface feature interact so as to fix the camera unit in place relative to the carriage such that the first axis is perpendicular to the planar array of light-sensitive pixels, and
there are no positional adjustment mechanisms between the carriage and the camera unit.

2. The imaging system of claim 1, wherein the camera unit includes:
a carriage-facing surface that faces towards the carriage, and
a first raised boss and a second raised boss, the first raised boss and the second raised boss protruding from the carriage-facing surface, wherein:
the first raised boss and the second raised boss form part of the second mechanical interface feature,
the first raised boss and the second raised boss are both in compressive contact with the carriage, and
the first raised boss and the second raised boss are machined so as to have a tolerance of ±0.02 degrees with respect to an axis normal to the planar array of light-sensitive pixels and a tolerance of ±0.03 mm of flatness with respect to one another.

3. The imaging system of claim 1, further comprising:
a fixed-focal-length lens having an aperture with an f-number of at least 1.4 or lower, the fixed-focal-length lens mounted to the lens mounting feature.

4. The imaging system of claim 1, further comprising:
at least two alignment shafts, wherein:
the first mechanical interface feature includes at least two first alignment holes, each first alignment hole sized to receive a corresponding alignment shaft, and
the second mechanical interface feature includes at least two second alignment holes, each second alignment hole corresponding in location to one of the first alignment holes and sized to receive the corresponding alignment shaft for the corresponding first alignment hole.

5. The imaging system of claim 4, wherein:
the alignment shafts are in the form of shoulder screws with a threaded portion and a shoulder portion having a larger diameter than the threaded portion,
the second alignment holes are threaded holes sized to receive the threaded portion of the corresponding alignment shaft, and
the first alignment holes each have a first diameter and the shoulder portion of the corresponding alignment shaft has a second diameter, and the first diameter is between 0 and 0.0005 inches larger than the second diameter.

6. The imaging system of claim 5, further comprising a mounting fixture, wherein:
the camera barrel has a cylindrical outer surface with a center axis,
the cylindrical outer surface includes a plurality of spaced-apart circumferential grooves that extend around the outer circumference of the camera barrel,
the camera barrel includes a mounting fixture surface that is parallel to the center axis and that defines a chord of the cylindrical outer surface,
the mounting fixture surface includes at least two first fixture alignment features,
the mounting fixture includes at least two second fixture alignment features as well as the second mechanical interface feature,
the first fixture alignment features and the second fixture alignment features interlock so as to fix the camera barrel in place relative to the mounting fixture, and
there are no positional adjustment mechanisms between the camera barrel and the mounting fixture.

7. The imaging system of claim 6, further comprising a seal plate, wherein:
the imaging sensor is mounted to an imaging printed circuit board (PCB) that includes a plurality of electrically conductive pins that protrude from a side of the imaging PCB on the opposite side of the imaging PCB from the imaging sensor,
the seal plate has one or more through-holes,
each electrically conductive pin protrudes through one of the through-holes,
the camera barrel includes a ledge surface within the interior volume, the seal plate rests on the ledge surface, and
the ledge surface is perpendicular to the mounting fixture surface to within a tolerance of ±0.25 degrees.

8. The imaging system of claim 6, wherein the mounting fixture further includes:
a carriage-facing surface that faces towards the carriage,
a first raised boss and a second raised boss, the first raised boss and the second raised boss protruding from the carriage-facing surface, and
a barrel-facing surface that faces towards the camera barrel, wherein:
the first raised boss and the second raised boss form part of the second mechanical interface feature,
the first raised boss and the second raised boss are both in compressive contact with the carriage, and
the first raised boss and the second raised boss are machined so as to have a tolerance of ±0.5 degrees with respect to the barrel-facing surface and a tolerance of ±0.5 degrees with respect to one another.

9. The imaging system of claim 6, wherein the cylindrical outer surface includes a plurality of slots, each slot extending along a direction having a component parallel to the center axis, having a depth within ±6% of the average depth of the circumferential grooves, and intersecting with each of the circumferential grooves.

10. The imaging system of claim 9, wherein each slot extends along a direction parallel to the center axis.

11. The imaging system of claim 1, wherein the lens mounting feature is part of the camera barrel.

12. The imaging system of claim 1, wherein:
the lens mounting feature is located in a plate that is located adjacent to the camera barrel,
three adjustment screws are located such that a threaded portion of each adjustment screw is threaded into a corresponding threaded hole located in either the plate or in the camera barrel and a bearing surface of each adjustment screw is in contact with a bearing surface of the other of the plate or the camera barrel, and
the plate is held against the camera barrel by a compression mechanism such that the adjustment screws are compressively loaded.

13. The imaging system of claim 1, further comprising an enclosure defining a plenum volume, wherein:
the camera unit is located within the plenum volume,
the enclosure includes a first port and a second port,
the camera unit is interposed between the first port and the second port,
the first port is configured to connect the plenum volume with a convective cooling system source, and
the second port is configured to connect the plenum with a convective cooling system exhaust.

14. The imaging system of claim 13, further comprising:
a flexible cooling duct fluidically connected with the first port; and
a flexible exhaust duct fluidically connected with the second port.

15. The imaging system of claim 13, wherein:
the enclosure has a side with a plurality of U-shaped slots milled in directions perpendicular to an edge of the side,
a plurality of U-shaped bosses exists proximate to the first mechanical interface feature and the second mechanical interface feature, and
the U-shaped bosses and the U-shaped slots intermesh to locate the enclosure relative to the camera unit.

16. The imaging system of claim 1, further comprising a reflector assembly, the reflector assembly including a mirror having a reflective surface arranged at 45°±0.5° to the first axis.

17. The imaging system of claim 16, further comprising a sample stage having a planar sample surface, the sample stage positioned beneath the reflector assembly and oriented such that the planar sample surface is parallel to the first axis.

* * * * *